US009355642B2

United States Patent
Wu et al.

(10) Patent No.: US 9,355,642 B2
(45) Date of Patent: May 31, 2016

(54) SPEAKER RECOGNITION METHOD THROUGH EMOTIONAL MODEL SYNTHESIS BASED ON NEIGHBORS PRESERVING PRINCIPLE

(75) Inventors: Zhaohui Wu, Hangzhou (CN); Yingchun Yang, Hangzhou (CN); Li Chen, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 197 days.

(21) Appl. No.: 14/346,960

(22) PCT Filed: Sep. 4, 2012

(86) PCT No.: PCT/CN2012/080959
§ 371 (c)(1),
(2), (4) Date: Mar. 24, 2014

(87) PCT Pub. No.: WO2013/040981
PCT Pub. Date: Mar. 28, 2013

(65) Prior Publication Data
US 2014/0236593 A1      Aug. 21, 2014

(30) Foreign Application Priority Data

Sep. 23, 2011  (CN) .......................... 2011 1 0284945

(51) Int. Cl.
| | | |
|---|---|---|
| G10L 17/26 | (2013.01) | |
| G10L 25/63 | (2013.01) | |
| G10L 15/14 | (2006.01) | |
| G10L 15/06 | (2013.01) | |

(52) U.S. Cl.
CPC ................. *G10L 17/26* (2013.01); *G10L 15/14* (2013.01); *G10L 25/63* (2013.01); *G10L 15/063* (2013.01)

(58) Field of Classification Search
CPC ..................................................... G10L 25/63
See application file for complete search history.

(56) References Cited

U.S. PATENT DOCUMENTS

| | | | | |
|---|---|---|---|---|
| 2008/0040110 | A1* | 2/2008 | Pereg ..................... | G10L 17/26 704/236 |
| 2009/0043573 | A1* | 2/2009 | Weinberg ................ | G10L 17/06 704/223 |
| 2012/0166195 | A1* | 6/2012 | Hayakawa .............. | G10L 17/04 704/240 |
| 2013/0253931 | A1* | 9/2013 | Shen ....................... | G10L 17/04 704/245 |
| 2014/0029757 | A1* | 1/2014 | Aronowitz ............. | H04R 29/00 381/59 |
| 2014/0112556 | A1* | 4/2014 | Kalinli-Akbacak .... | G10L 25/63 382/128 |

\* cited by examiner

*Primary Examiner* — Douglas Godbold
(74) *Attorney, Agent, or Firm* — Jiwen Chen

(57) ABSTRACT

A speaker recognition method through emotional model synthesis based on Neighbors Preserving Principle is enclosed. The methods includes the following steps: (1) training the reference speaker's and user's speech models; (2) extracting the neutral-to-emotion transformation/mapping sets of GMM reference models; (3) extracting the emotion reference Gaussian components mapped by or corresponding to several Gaussian neutral reference Gaussian components close to the user's neutral training Gaussian component; (4) synthesizing the user's emotion training Gaussian component and then synthesizing the user's emotion training model; (5) synthesizing all user's GMM training models; (6) inputting test speech and conducting the identification. This invention extracts several reference speeches similar to the neutral training speech of a user from a speech library by employing neighbor preserving principles based on KL divergence and combines an emotion training speech of the user using the emotion reference speech in the reference speech, improving the performance of the speaker recognition system in the situation where the training speech and the test speech are mismatched, and the robustness of the speaker recognition system is increased.

6 Claims, 1 Drawing Sheet

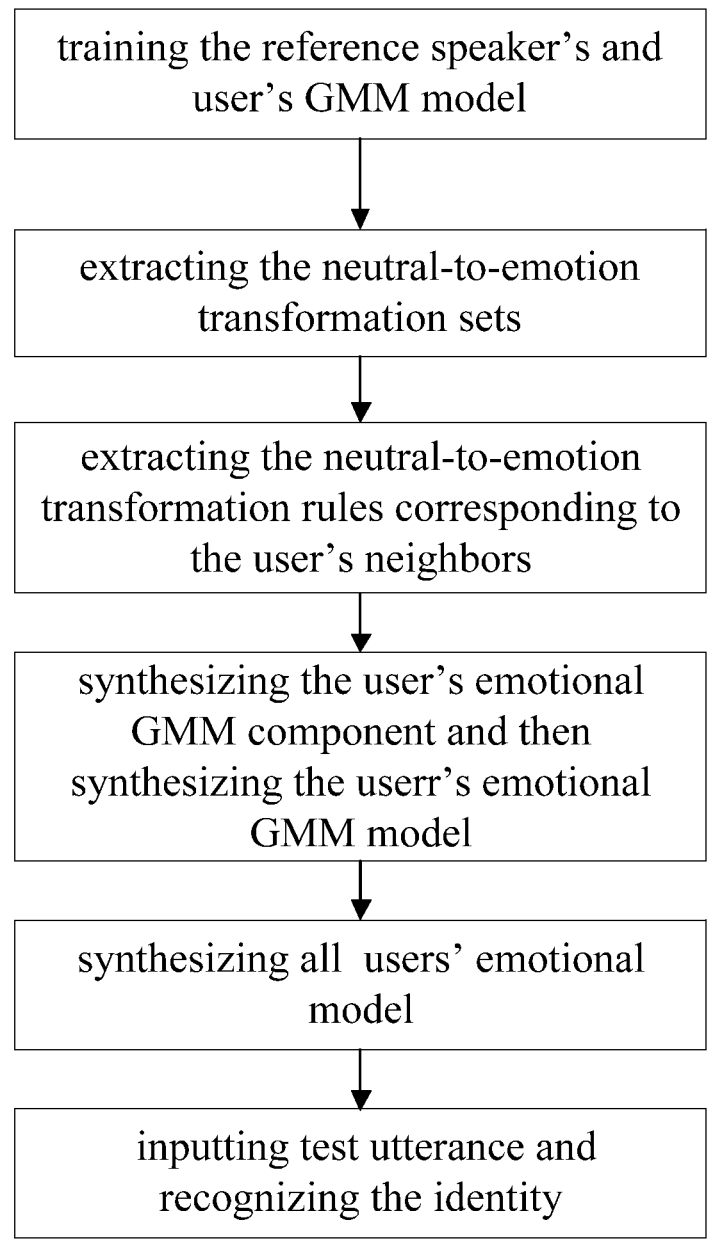

SPEAKER RECOGNITION METHOD THROUGH EMOTIONAL MODEL SYNTHESIS BASED ON NEIGHBORS PRESERVING PRINCIPLE

This is a U.S. national stage application of PCT Application No. PCT/CN2012/080959 under 35 U.S.C. 371, filed Sep. 4, 2012 in Chinese, claiming the priority benefit of Chinese Application No. 201110284945.7, filed Sep. 23, 2011, which is hereby incorporated by reference.

TECHNICAL FIELD

The present invention relates to pattern recognition technology field, especially in the field of speaker recognition through emotional model synthesis based on the neighbors preserving principle.

BACKGROUND OF THE ART

Speaker recognition technology is to recognize the speaker's identity by using signal processing and pattern recognition. It mainly contains two procedures: speaker model training and speech evaluation.

Presently, the main features adopted for speaker recognition are the MFCC (Mel-Frequency Cepstral Coefficient), LPCC (Linear Predictive Cepstral Coefficients), PLP (Perceptual Linear Prediction). The main recognition algorithms include VQ (Vector Quantization), GMM-UBM (Gaussian Mixture Model-Universal Background Model), and SVM (Support Vector Machine) and so on. GMM-UBM is most commonly used recognition algorithm in the field of speaker recognition.

On the other hand, in speaker recognition, the speaker's training speech is usually neutral speech, because in reality application, a user under ordinary circumstance only provides a speech of neutral pronunciation or condition to train the user's model. It is not actually easy or convenient to achieve when requiring all users to provide their own speeches under all emotional states. Meanwhile, this is very high requirement to the load of system's database.

However, during actual tests, a speaker may utter speech of different emotional states, such as elation, sadness and anger and so on according to feelings at that time. Current speaker recognition algorithm cannot handle or self-adapt the mismatch between training speech and test speech, which causes the speaker recognition performance to deteriorate and the success rate of emotional speech to greatly reduce.

SUMMARY OF THE INVENTION

In order to overcome the drawbacks of the prior art, the present invention provides a speaker recognition method through emotional model synthesis based on neighbors preserving principle to reduce the mismatch between training and test stages and to improve the identification success rate to the emotional speech.

The present invention is a speaker recognition method through emotional model synthesis based on neighbors preserving principle, the method comprising the following steps:

(1) Obtaining several reference speakers' speech and the user's neutral speech, and conducting model training to all these speeches to obtaining these reference speakers' GMM (Gaussian Mixture Model) models and the user's neutral GMM model;

The reference speakers' speeches include neutral speech and speech under "m" types of different emotional states. The reference speaker's GMM models include neutral GMM model and GMM models under "m" types of different emotional states (where m is a natural number greater than 0);

(2) Extracting neutral-to-emotion Gaussian component transformation or mapping set from these reference speakers under each GMM component;

(3) According to KL (Kullback-Leibler) divergence calculation method, respectively calculating the KL divergence between each neutral training Gaussian component in the neutral training model and neutral reference Gaussian components in all neutral reference models; selecting the "n" neutral reference Gaussian components having the smallest KL divergence with each corresponding neutral training Gaussian component; then selecting "m" emotion reference Gaussian components corresponding to each neutral reference Gaussian component in "n" neutral reference Gaussian components, where n is a natural number greater than 0;

(4) Combining the selected n×m Gaussian components corresponding to each neutral training Gaussian component to obtain "m" emotion training Gaussian component, and further obtain "m" emotional training models for the user.

(5) Repeating step (1) to step (4) to synthesize the GMM training models for all users. The GMM training model includes the neutral training models and "m" emotional training models.

(6) Inputting a user's test speech, and computing the likelihood score between the test speech and all users' GMM training models, respectively. The corresponding user of the GMM training model with the greatest likelihood score is labeled as the identified speaker.

In the above step (1), the model training process for all speeches are as follows: First, sequentially conducting pre-processing to the speeches by sampling and quantifying, removing zero-drift, pre-emphasis and windowing; then, extracting features/characteristics from the pre-processed speeches by using the method based on the Mel Frequency Cepstral Coefficient (MFCC) or Linear Prediction Cepstral Coefficient (LPCC) extraction, obtaining the features vector set of the speeches; training the UBM (Universal Background Model) of the features vector set through using EM (Expectation Maximization) algorithm; and training and obtaining speeches' GMM model from UBM model by using MAP (Maximum A Posterior) method.

The neutral-to-emotion Gaussian components transformation set indicates the transformation relationship between the neutral reference Gaussian components of the neutral reference models and emotion reference Gaussian components of each emotion reference model.

The KL divergence computation formula is:

$$\delta = \frac{1}{2}\left[\log\frac{|\Sigma_1|}{|\Sigma_2|} + Tr(\Sigma_2^{-1}\Sigma_1) + (\mu_1 - \mu_2)^T \Sigma_2^{-1}(\mu_1 - \mu_2)\right] \quad (1)$$

In equation (1), $\delta$ is the KL divergence, $\mu_1$ and $\Sigma_1$ respectively represent the mean and variance of the first Gaussian component, while $\mu_2$ and $\Sigma_2$ respectively represent those of the second Gaussian component.

In the step (4), the methods/algorithm based on neighbor preserving location or neighbor preserving change is used to synthesize the n×m emotion reference Gaussian components corresponding to each neutral training Gaussian component into the m emotion training Gaussian component;

The formula for neighbor preserving location algorithm is:

$$\mu_e = \frac{1}{n}\sum_{i=1}^{n}\mu_{e,i} \qquad (2)$$

In equation (2), $\mu_e$ is the mean of any one emotion training Gaussian component corresponding to neutral training Gaussian component, while $\mu_{e,\,i}$ is the mean of the i-th emotion reference Gaussian component among "n" corresponding emotion reference Gaussian components.

The formula for neighbor preserving change algorithm is:

$$\mu_e = \mu_k + \frac{1}{n}\sum_{i=1}^{n}(\mu_{e,i} - \mu_{k,i}) \qquad (3)$$

In equation (3), $\mu_e$ is the mean of any one emotion training Gaussian component corresponding to neutral training Gaussian component, while $\mu_{e,\,i}$ is the mean of the i-th emotion reference Gaussian component among "n" corresponding emotion reference Gaussian components; $\mu_k$ is the mean of neutral training Gaussian component, while $\mu_{k,\,i}$ mean of the i-th neutral reference Gaussian component among "n" corresponding neutral reference Gaussian component.

In the said step (6), the formula of computing the likelihood score of the test speech against all user's GMM training model is:

$$\text{Score} = \frac{1}{T}\sum_{t=1}^{T}\sum_{k=1}^{j}\omega_k \max[P(x_t \mid C_k), P(x_t \mid E_k)] \qquad (4)$$

In equation (4), T is the number of feature frames of test speech, $x_t$ is the t-th frame characteristic of the test speech, j is the order of the GMM training model, $C_k$ is the k-th neutral training Gaussian component of the user's neutral training model, $E_k$ is the k-th emotion training Gaussian component of the user's emotion training model, $\omega_k$ is the weight for $C_k$ and $E_k$, $P(x_t|C_k)$ is the likelihood score of $x_t$ against $C_k$, $P(x_t|E_k)$ is the likelihood score of $x_t$ against $E_k$.

It has been observed through experiments that if two speakers sound similar in neutral speech, so do they under other emotional states. This invention finds a number of reference speeches that are similar to the user's neutral training speeches from speech database under the neighbor preserving principle based on KL divergence. The user's emotional GMM model is synthesized through the emotion reference model corresponding to the neutral reference model. The present invention also improves the speaker identification system function under the mismatch condition between training speech and test speech and the robustness of the speaker recognition system is increased.

BRIEF DESCRIPTION OF THE DRAWINGS

FIG. 1 shows the flow chart of the present invention.

IMPLEMENTATION EMBODIMENTS OF THE INVENTION

In order to more specifically describe the present invention, in combination with the drawings and specific embodiments, the speaker identification method of the present invention is described below.

With reference to FIG. 1, the specific steps of the speaker recognition method through emotional model synthesis based on neighbors preserving principle are as follows:

(1) Training the reference speech's and users' neutral speech model.

25 reference speeches and 20 users' neutral training speeches were gathered. All these speeches were gathered by Olympus DM-20 recorder in a quiet environment. The speeches were the speeches of 25 native mandarin Chinese speakers and the speeches of 20 users. A set of reference speech included a speaker's 5 types of emotion speeches: neutral, anger, elation, panic and sadness speeches. Each speaker read two neutral paragraphs under neutral condition. Meanwhile, each speaker spoke 5 phrases and 20 sentences respectively 3 times under each emotional state. The neutral training speech was only user's speech under neutral condition, i.e. the users read 2 neutral paragraphs under neutral condition.

Consequently, model training for all collected speeches were conducted to obtain 25 reference speakers' GMM reference models and 20 users' neutral training model. Each reference GMM reference models include a neutral model and 4 emotional models.

The model training process for the speeches are as follows; First, sequentially conducting pre-processing to the speeches by sampling and quantifying, removing zero-drift, pre-emphasis and windowing; then, extracting features/characteristics from the pre-processed speeches by using the method based on the Mel Frequency Cepstral Coefficient (MFCC) or Linear Prediction Cepstral Coefficient (LPCC) extraction, obtaining the features vector set of the speeches. The extracted feature vector is $X=[x_1, x_2, \ldots, x_T]$, where T is the number of speech features and each feature is p-dimensional vector; training the UBM of the features vector set through using EM algorithm; and training and obtaining speeches' GMM model from UBM model by using MAP method. The followings are the speaker's neutral reference model and emotional reference model of the reference speech's GMM reference models:

$$\lambda_N = \sum_{k=1}^{j} \omega_k \mathcal{N}(x \mid \mu_{N,k}, \Sigma_{N,k}) \qquad (5)$$

$$\lambda_E = \sum_{k=1}^{j} \omega_k \mathcal{N}(x \mid \mu_{E,k}, \Sigma_{E,k})$$

In equation (5), $\lambda_N$ is the reference speech's neutral reference model. $\omega_k$ is the weight of the k-th neutral reference Gaussian component, $\omega_k$ of each GMM model is same to $\omega_k$ of UBM because MAP's self-adaptation, the weight remains the same. $\mu_{N,\,k}$ and $\Sigma_{N,\,k}$ are respectively the mean and variance of the neutral reference model's k-th neutral Gaussian component. Correspondingly, $\lambda_E$ is the reference speech's emotional reference model. $\mu_{E,\,k}$ and $\Sigma_{E,\,k}$ are respectively the mean and variance of the elation reference model's k-th emotional reference Gaussian components.

(2) Extracting the neutral-to-emotion transformation set for Gaussian components through the GMM reference model.

Extracting the neutral-to-emotion transformation set for Gaussian components through the GMM reference model: The neutral-to-emotion transformation set for Gaussian components indicates the correspondence relationship between the neutral reference Gaussian components of the neutral reference model and the emotion reference Gaussian components of the emotion reference: $\mathcal{N}(x|\mu_{N,k}, \Sigma_{N,k}) \mathcal{N} \Leftrightarrow (x|\mu_{E,k}, \Sigma_{E,k})$.

(3) Extracting the emotion reference Gaussian component in correspondence to several neutral reference Gaussian components that are close to the user's neutral training Gaussian components.

According to KL divergence calculation method, respectively calculating the KL divergence between each neutral training Gaussian component in the neutral training model and neutral reference Gaussian components in all neutral reference models;

The KL divergence computation formula is:

$$\delta = \frac{1}{2}\left[\log\frac{|\Sigma_1|}{|\Sigma_2|} + Tr(\Sigma_2^{-1}\Sigma_1) + (\mu_1 - \mu_2)^T \Sigma_2^{-1}(\mu_1 - \mu_2)\right] \quad (6)$$

In equation (6), $\delta$ is the KL divergence, $\mu_1$ and $\Sigma_1$ respectively represent the mean and variance of the first Gaussian component, while $\mu_2$ and $\Sigma_2$ represent the mean and variance of the second Gaussian component.

Selecting the nearest 10 neutral reference Gaussian components that have the smallest KL divergence with and correspond to each neutral training Gaussian components; further selecting 4 emotion reference Gaussian components corresponding to each neutral reference Gaussian component in 10 neutral reference Gaussian components, pursuant to neutral-emotion Gaussian components transformation set.

(4) Synthesizing the user's emotional training Gaussian component and then obtaining the user's emotional training model.

Synthesizing the 10×4 emotion reference Gaussian components that correspond to each neutral training Gaussian component to obtain 4 corresponding emotion training Gaussian components, and then further obtain the user's 4 emotion training model, based on neighbor preserving location algorithm.

The formula for neighbor preserving location algorithm is:

$$\mu_e = \frac{1}{n}\sum_{i=1}^{n}\mu_{e,i} \quad (7)$$

In equation (7), $\mu_e$ is the mean of an emotion training Gaussian component that corresponds to neutral training Gaussian component, while $\mu_{e,i}$ is the mean of the i-th emotional reference Gaussian component among "n" corresponding emotion reference Gaussian components.

(5) Synthesizing all users' GMM training models.

Repeating step (1) to step (4) to synthesize the GMM training model for each user. In this example, a set of GMM training model includes one neutral training model and 4 emotion training models.

(6) Inputting test speech and recognizing the identity.

Inputting the test user's speech, and computing the likelihood score between the test speech and all users' GMM training model. The user with the greatest likelihood score that corresponds to the GMM training model is labeled as the identified speaker.

The formula of computing the likelihood score is:

$$Score = \frac{1}{T}\sum_{t=1}^{T}\sum_{k=1}^{j}\omega_k \max[P(x_t|C_k), P(x_t|E_k)] \quad (8)$$

In equation (8), T is the number of characteristics frames of test speech, $x_t$ is the t-th frame of the test speech, j is the order of the GMM model (which is 1024 is this example), $C_k$ is the k-th neutral training Gaussian component of the user's neutral training model, $\omega_k$ is the k-th emotion training Gaussian component of the user's emotional training model, $\omega_k$ is the weight for $C_k$ and $E_k$, $P(x_t|C_k)$ is the likelihood score of $x_t$ against $C_k$, $P(x_t|E_k)$ is the likelihood score of $x_t$ against $E_k$.

Table 1 illustrates the comparison of the Identification Rate between GMM-UBM and the present invention under neutral, anger, elation, panic and sadness emotional states. Each utterance is framed by using a 100-ms Hamming window, and the step length is 80 ms. The 13-order MFCC is extracted to train UBM, self-adapting each speaker's model and speaker recognition evaluation.

TABLE 1

The comparison of the Identification Rate between GMM-UBM and the present invention

| Emotion Category | GMM-UBM | Present Invention |
|---|---|---|
| Neutral | 96.47% | 95.33% |
| Anger | 34.87% | 38.40% |
| Elation | 38.07% | 45.20% |
| Panic | 36.60% | 40.07% |
| Sadness | 60.80% | 61.80% |

It is shown that the present invention can effectively identify the reliable characteristics of the speeches, and the identification rate greatly improved under each emotional state. The average Identification Rate increases by 2.81%. Thus, the present invention greatly helps improve the function of the speaker identification system and robustness of the system.

The invention claimed is:

1. A speaker recognition method through emotional model synthesis based on neighbors preserving principle, characterized in that the method comprising the following steps of:

(1) obtaining a plurality sets of reference speeches and a user's neutral training speech, and conducting model training to these speeches to obtain a plurality sets of Gaussian Mixture Model (GMM) reference models and a user's neutral training model;

the reference speeches comprising neutral reference speech and "m" emotion reference models, where m is a natural number greater than 0;

(2) extracting a neutral-to-emotion Gaussian components transformation set from each set of GMM reference model;

(3) according to KL (Kullback-Leibler) divergence calculation method, respectively calculating KL divergence between each neutral training Gaussian component in the neutral training model and neutral reference Gaussian components in all neutral reference models; selecting "n" neutral reference Gaussian components having the smallest KL divergence with each corresponding neutral training Gaussian component; then selecting "m" emotion reference Gaussian components corresponding to each neutral reference Gaussian component in "n" neutral reference Gaussian components, where n is a natural number greater than 0;

(4) combining the selected n×m Gaussian components corresponding to each neutral training Gaussian component to obtain "m" emotion training Gaussian component, and further obtain "m" emotional training models for the user;

(5) repeating step (1) to step (4) to synthesize the GMM training models for all users;

(6) inputting a user's test speech, and computing likelihood score between the test speech and all users' GMM training models, respectively, identifying a corresponding user of the GMM training model with the greatest likelihood score as a speaker to be identified.

2. The method of the speaker recognition method through emotional model synthesis based on neighbors preserving principle according to claim 1, characterized in that, in the Step (1), the model training process comprising:

first, sequentially conducting pre-processing to the speeches by sampling and quantifying, removing zero-drift, pre-emphasis and windowing; then, extracting features/characteristics from the pre-processed speeches by using the method based on the Mel Frequency Cepstral Coefficient (MFCC) or Linear Prediction Cepstral Coefficient (LPCC) extraction, obtaining the features vector set of the speeches; training a UBM (Universal Background Model) of the features vector set through using EM (Expectation Maximization) algorithm; and training and obtaining speeches' GMM model from UBM model by using MAP (Maximum A Posterior) method.

3. The method of the speaker recognition method through emotional model synthesis based on neighbors preserving principle according to claim 1, characterized in that, the neutral-to-emotion Gaussian components transformation set indicates the transformation relationship between the neutral reference Gaussian components of the neutral reference models and emotion reference Gaussian components of each emotion reference model.

4. The method of the speaker recognition method through emotional model synthesis based on neighbors preserving principle according to claim 1, characterized in that, in the Step (4), the KL divergence computation formula is:

$$\delta = \frac{1}{2}\left[\log\frac{|\Sigma_1|}{|\Sigma_2|} + Tr(\Sigma_2^{-1}\Sigma_1) + (\mu_1 - \mu_2)^T \Sigma_2^{-1}(\mu_1 - \mu_2)\right] \quad (1)$$

wherein: $\delta$ is the KL divergence, $\mu_1$ and $\Sigma_1$ respectively represent the mean and variance of the first Gaussian component, while $\mu_2$ and $\Sigma_2$ respectively represent those of the second Gaussian component.

5. The method of the speaker recognition method through emotional model synthesis based on neighbors preserving principle according to claim 1, characterized in that, in the Step (4), algorithms based on neighbor preserving location or neighbor preserving change are used to synthesize the n×m emotion reference Gaussian components corresponding to each neutral training Gaussian component into the m emotion training Gaussian component;

the formula for neighbor preserving location algorithm is:

$$\mu_e = \frac{1}{n}\sum_{i=1}^{n}\mu_{e,i} \quad (2)$$

in equation (2), $\mu_e$ is the mean of any one emotion training Gaussian component corresponding to the neutral training Gaussian component, while $\mu_{e,i}$ is the mean of the i-th emotion reference Gaussian component among "n" corresponding emotion reference Gaussian components;

the formula for neighbor preserving change algorithm is:

$$\mu_e = \mu_k + \frac{1}{n}\sum_{i=1}^{n}(\mu_{e,i} - \mu_{k,i}) \quad (3)$$

in equation (3), $\mu_e$ is the mean of any one emotion training Gaussian component corresponding to the neutral training Gaussian component, while $\mu_{e,i}$ is the mean of the i-th emotion reference Gaussian component among "n" corresponding emotion reference Gaussian components; is the mean of the neutral training Gaussian component, while $\mu_{k,i}$ mean of the i-th neutral reference Gaussian component among "n" corresponding neutral reference Gaussian component.

6. The method of the speaker recognition method through emotional model synthesis based on neighbors preserving principle according to claim 1, characterized in that, in the Step (6), the formula of computing the likelihood score of the test speech against all user's GMM training model is:

$$\text{Score} = \frac{1}{T}\sum_{t=1}^{T}\sum_{k=1}^{j}\omega_k \max[P(x_t | C_k), P(x_t | E_k)] \quad (4)$$

in equation (4), T is the number of feature frames of test speech, $x_t$ is the t-th frame characteristics of the test speech, j is the order of the GMM training model, $C_k$ is the k-th neutral training Gaussian component of the user's neutral training model, $E_k$ is the k-th emotion training Gaussian component of the user's emotion training model, $\omega_k$ is the weight for $C_k$ and $E_k$, $P(x_t|C_k)$ is the likelihood score of $x_t$ against $C_k$, $P(x_t|E_k)$ is the likelihood score of $x_t$ against $E_k$.

* * * * *